United States Patent [19]

Haug

[11] Patent Number: 4,888,764

[45] Date of Patent: Dec. 19, 1989

[54] TRANSMISSION-RECEPTION EQUIPMENT FOR A BUS SYSTEM

[75] Inventor: Friedrich Haug, Munich, Fed. Rep. of Germany

[73] Assignee: Siemens Aktiengesellschaft, Berlin and Munich, Fed. Rep. of Germany

[21] Appl. No.: 131,802

[22] Filed: Dec. 11, 1987

[30] Foreign Application Priority Data

Dec. 11, 1986 [DE] Fed. Rep. of Germany ....... 3642382

[51] Int. Cl.$^4$ .............................................. H04J 3/02
[52] U.S. Cl. ..................................... 370/85.1; 375/17; 375/7; 375/36
[58] Field of Search ............. 370/85, 86, 88, 89, 370/94; 375/7, 17, 36; 340/825.5

[56] References Cited

U.S. PATENT DOCUMENTS

| | | | |
|---|---|---|---|
| 3,671,671 | 6/1972 | Watanabe | 178/68 |
| 3,980,826 | 9/1976 | Widmer | 375/36 |
| 4,083,005 | 4/1978 | Looschen | 375/17 |
| 4,282,260 | 8/1981 | Flora | 375/17 |
| 4,380,080 | 4/1983 | Rattingourd | 375/17 |
| 4,638,311 | 1/1987 | Gerety | 370/85 |
| 4,710,943 | 12/1987 | Duley | 375/36 |
| 4,719,458 | 1/1988 | Miesterfeld et al. | 370/85 |

FOREIGN PATENT DOCUMENTS

| | | |
|---|---|---|
| 0132645 | 2/1985 | European Pat. Off. . |
| 0171555 | 2/1986 | European Pat. Off. . |
| WO 84/00862 | 3/1984 | World Int. Prop. O. . |

OTHER PUBLICATIONS

"The D$^2$B a One Logical Wire Bus for Consumer Applications" IEEE Transactions on Consumer Electronics, vol. CE-27, Feb. 1981, No. 1, pp. 102–116.

"Ultra-Low Cost Network for Personal Computers", BYTE Publications, Inc., Oct. 1961, pp. 50–60.

Primary Examiner—Douglas W. Olms
Assistant Examiner—Min Jung
Attorney, Agent, or Firm—Hill, Van Santen, Steadman & Simpson

[57] ABSTRACT

Transmission-reception equipment for a bus system and for handling access collision of subscriber stations connected dc-free in a bus system preferably constructed with a shielded twisted-pair cable. The transmission-reception equipment of the subscriber stations at their transmission sides, has a difference bus transmitter unlocked for only a fraction of a bit time span and thereby outputting a difference voltage pulse of one the other operational sign but placed in a quiescent condition in the remaining part of every bit time span. At the reception side of the subscriber stations, two difference bus receivers are connected to the bus signal conductors, oppositely in comparison to one another, and a bi-stable RS flip-flop has its inputs connected to outputs of the difference bus receivers.

11 Claims, 3 Drawing Sheets

U.S. Patent  Dec. 19, 1989  Sheet 1 of 3  4,888,764

TRANSMISSION-RECEPTION EQUIPMENT FOR A BUS SYSTEM

BACKGROUND OF THE INVENTION

For a fast exchange of digital signals between frequently changing remote stations, for example between telecommunications terminals, between computers serving for data processing or even between exchange-oriented processors, bus systems are frequently employed in which the respectively connected stations have random access to the bus system via transmission and reception equipment. The digital signals thereby emitted from a station are transmitted on the bus toward both sides and, based on decoding of preceding addresses, are only accepted by the station or stations identified by the address or addresses. What is referred to as CSMA/CD (carrier sense multiple access with collision detection) has gained particular significance for the control of access to the bus system; before a station begins to send, it listens on the bus to see whether a transmission event is already occurring. When there is a transmission, the station initially waits for the end of the transmission, afterwhich the station then begins to send. It initially continues to listen until it is certain, after a defined time span (round trip delay time), that all other stations have received its transmitted signals. When another station has begun to transmit at approximately the same time, then the two stations will identify a collision of their digital signals, whereupon they will respectively abort their transmission operation in order to begin a new transmission after a random time span.

A simple method for identifying multiple transmissions is as follows. The active station compares the signal it is to output to the signal statuses prevailing at its reception equipment which is connected to the bus system, whereby a signal status difference indicates a collision. The recognition of such a signal status difference assumes that one signal status can always physically prevail over the other signal statuses (given binary signals) on the bus system. Regardless of the number of transmitters which are active roughly simultaneously, this signal priority must also be guaranteed for line lengths of more than 100 m for every station.

This prerequisite is not met by present commercially available standard transmitters having two difference outputs for a bus system having two signal conductors. For such bus transmitters which are usually switched into a third, quiescent condition (tri state) in times of inactivity, i.e., outside of the bit time spans of transmitted bits, opposed signal statuses which can lead to signal errors or to transmitter damage due to overload can be avoided in this quiescent condition for clock-controlled or access-controlled bus systems. In a random access bus system, the access control is based on opposing signal statuses, however, such opposing signal statuses may not be recognized under certain conditions when using ordinary standard bus transmitters in a system having long line lengths between stations which are far apart. The opposing signal statuses may be overlooked due to the voltage drop along the bus or line lengths.

Such a standard bus transmitter is not used in a known bus system (see Pct Patent application No. WO-A-84/00862) having two signal conductors in which transmission equipment has two signal statues and has two switches closed or opened synchronously with one another and connected to two signal conductors via two-unequal-voltage sources. One of these two signal statuses effects a dominance condition in the bus system and one of the connected transmission equipment leaves the two signal conductors at least approximately unloaded in the other thereof. Such transmission equipment can be realized with a special transmitter having internal resistance asymmetrical difference outputs; alternatively thereto, it is also possible to realize the switches with two simultaneously conductive or inhibited transistors via which two unequal voltage sources can be connected to the two signal conductors. Such a bus system thus requires bus transmitters having special asymmetries, whereas standard difference transmitters may possibly have internal resistance symmetrical complementary outputs.

Another bus system (disclosed by U.S. Pat. No. 3,671,671) has two signal conductors and does not provide any standard bus transmitters, but provides special transmission equipment each having a constant current source which can be switched on and off by means of a transistor switch.

A further bus system (disclosed in an article in BYTE 6 (1981) Pages 50–60 and, FIG. 1) is known in which a decoupling diode is provided between a sole output of every transmission equipment and a sole signal conductor. This system is non-symmetrical since it comprises only a single signal conductor.

A bus system (disclosed by European response EP-Al-0171555) has two signal conductors with transmission equipment connected thereto via two difference outputs and has two signal statuses one of which effects a dominance signal status in the bus system and for the other of which the transmission equipment leaves the two signal conductors at least approximately unloaded. The two difference outputs at the transmission equipment respectively formed with the bus transmitters are connected to the two signal conductors via two mutually opposite diodes which are in an inhibited condition in the other signal status.

This bus system without excluding use of tri-state transmitters, and which also enables a utilization of simple bus transmitters (without tri-state) having symmetrically executed complementary outputs, guarantees a uniform signal status in the bus system independent of the extent of the bus system and of the distance between the plurality of transmitters which are roughly simultaneously active. Also an overload of the transmitter outputs for opposing signal statuses, is avoided. An increased reliability in the recognition of a collision between transmitters given simultaneous access to the bus is guaranteed. The system, however, presumes a galvanic coupling of the transmission-reception equipment to the two signal conductors.

Such a galvanic coupling of the transmission-reception equipment to the signal conductors of a bus system, however, is frequently undesired and the object of the present invention is to specify transmission-reception equipment for a bus system having two signal conductors which enables a fast collision recognition given access of the bus system even without such galvanic coupling, with simple means and with high reliability.

SUMMARY OF THE INVENTION

The invention is directed to transmission-reception equipment for a bus system having two signal conductors, having difference bus transmitters capable of two signal statuses and connected to the signal conductors via two difference outputs. A difference bus receiver is connected to the signal conductors via two difference inputs. Such transmission-reception equipment is inventively characterized in that at least one difference bus transmitter is provided at the transmission side. The transmitter is unlocked (that is, taken out of its quiescent condition) only for a fraction of a bit time span, particularly for about one-fourth of a bit time span, after every level transition of the transmission data supplied to it and thereby outputting a positive or negative difference voltage pulse dependent on the new signal level. This difference bus transmitter is situated in a quiescent condition having high internal resistance (tri-state condition) in the remaining part of every bit time span, particularly for about three-fourths of every bit time span. Two difference bus receivers are connected to the signal conductors in senses opposite to one another. A bi-stable RS flip-flop having its two inputs connected to outputs of the two difference bus receivers are provided at the reception side.

The invention produces the advantage in a bus system having two signal conductors in which standardized difference bus tranmitters and receivers have symmetrical complementary outputs and inputs. The present invention can also connect the subscriber stations in a bus galvanically decoupled manner. The present invention provides a fast and reliable collision recognition with simple means without the necessity of a galvanic coupling.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
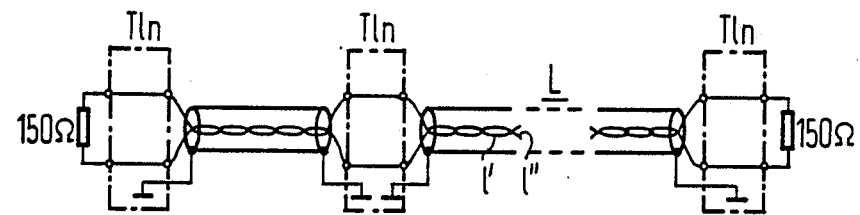
FIG. 1 is a schematic view of a bus system having connected subscriber stations.

FIG. 1 of the drawings schematically shows a serial bus system L having two signal conductors 1', 1" and a line shield (ground); such a bus system can be preferably realized with a shielded cable (twisted pair cable) having two twisted leads and having a characteristic impedence of, for example, 150 Ohms, for example a cable 2Y(St)Y1×2×0.5/2.2−150, whereby the two twisted leads form the two signal conductors 1', 1". Subscriber stations Tln are connected to the bus system L, each being connected thereto via transmission-reception equipment, as may be seen in greater detail in FIG. 2.

Figure 2:
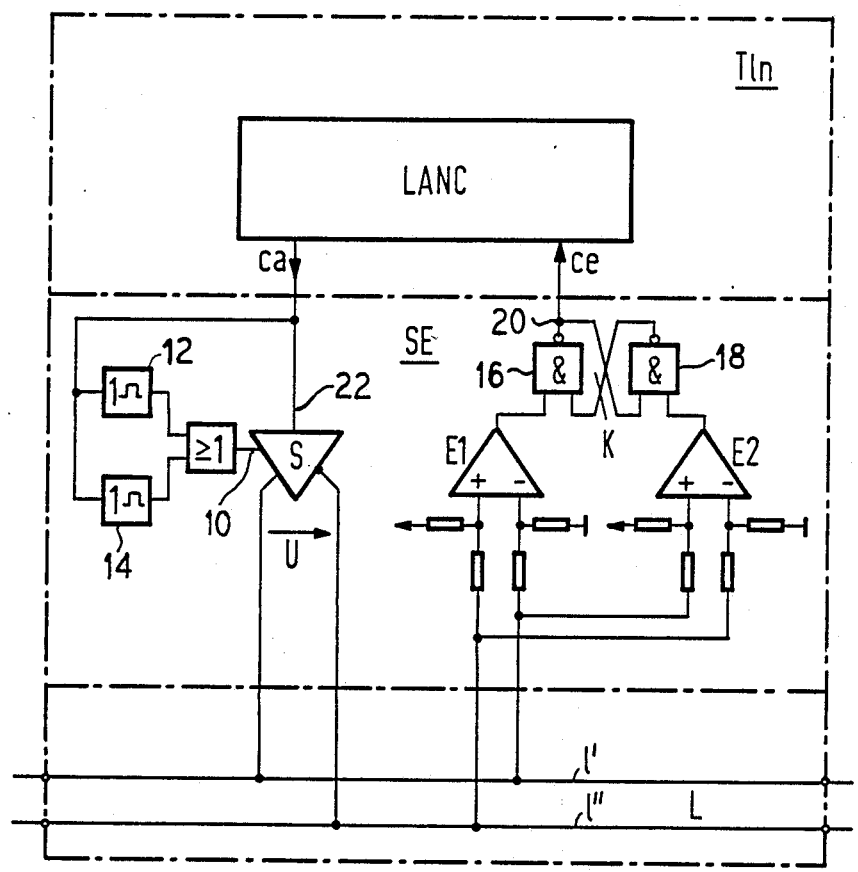
FIG. 2 is a block diagram of circuit details of the transmission-reception equipment of the FIG. 1 subscriber station.

According to FIG. 2, such a subscriber station Tln can be used in telecommunications terminal equipment, a computer or a switching processor. The station Tln has a transmission-reception equipment SE having a difference bus transmitter S connected to the signal conductors 1', 1" from two difference outputs and having two difference bus receivers E1, E2 connected to the signal conductors 1', 1" in directions opposite one another.

A difference bus transmitter S, respectively unlocked only for a fraction of a bit time span after every level transition of the transmission data supplied to it thereby outputting a positive or negative difference voltage pulse U dependent on the new signal level, is provided at the transmission side. Such a difference bus transmitter S can be realized with a tri-state bus transmitter of a bus transmitter module, for example, type SN74ALS1631 (TI), which also exhibits a quiescent condition as a third status in addition to two signal statuses. This tri-state bus transmitter is supplied at its unlocking input 10 with an unlocking pulse likewise lasting only a fraction of a bit time span, being supplied therewith after every level transmission of the transmission data supplied at the transmission data input of the difference bus transmitter S. Such unlocking pulses can thereby be derived from the transmission data, for example with the assistance of two monostable circuits 12, 14, for instance the type 74LS123, activated at a level transition of one or the other operational sign, as likewise indicated in FIG. 2. The two difference bus receivers E1, E2 (for example, type SN75173) connected to the signal conductors 1', 1" of the bus system L in mutually opposite directions at the input side, have their output sides connected to the S input, or R input of a bi-stable RS flip-flop K which, in accordance FIG. 2, can be realized with two cross-coupled NAND elements 16, 18, for example type SN74ALS00. The receive data input ce of a Local Area Networwk(LAN) controller LANC (for example, type 82588) is connected to the output 20 of the RS flip-flop K, the transmission data output ca of this LAN controller LANC is connected to the transmission data input 22 of the difference bus transmitter S.

Figure 3:
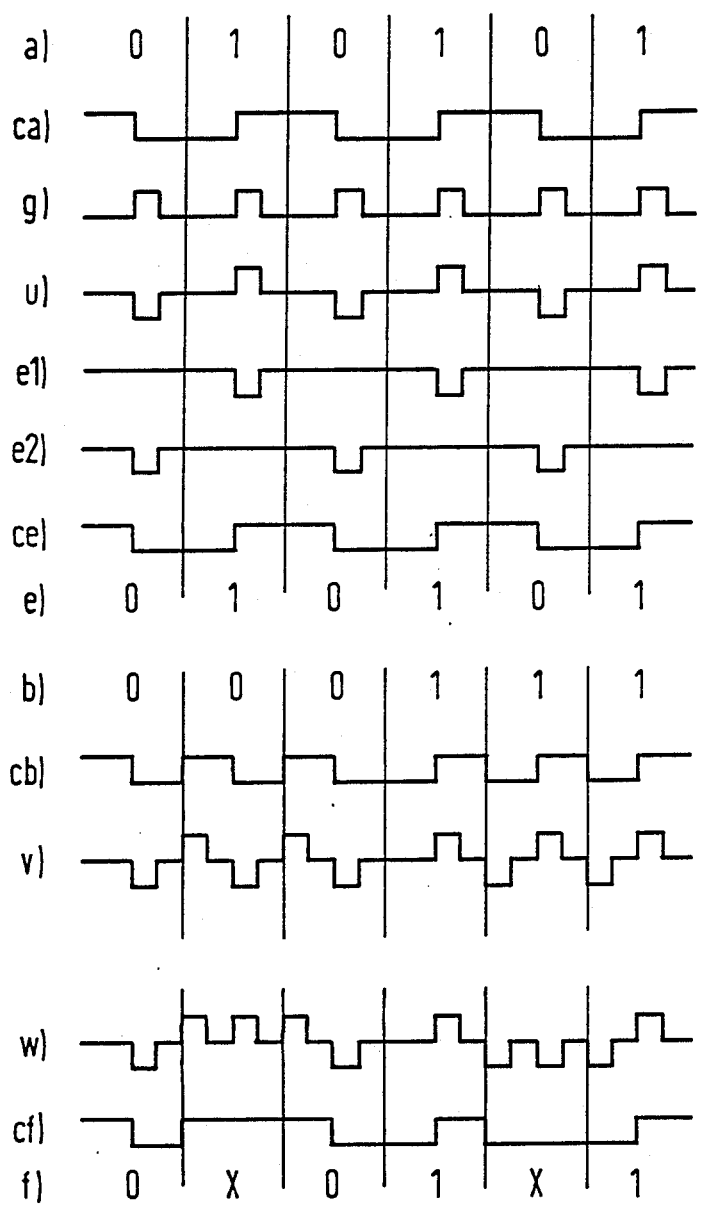
FIG. 3 illustrates signal statuses of the FIG. 1 system.

After every level transition of the transmission data coming from the output ca of the LAN controller LANC as indicated in FIG. 3 (Ca) provided, for example, from a bit sequence specified in FIG. 3 (a), the one or the other monostable flip-flop 12, 14 supplies the unlocking input 10 of the difference bus transmitter S with an unlocking pulse, given bit time spans of, for example, 1 µs, having a duration of about 250 ns, whereby FIG. 3 (g) shows a sequence of such unlocking pulses. In response to transmission data according to FIG. 3 (ca) supplied to it at the transmation data input and coded, for example, in Manchester Code, the difference bus transmitter S then generates corresponding, positive or negative difference voltage pulses u (see FIG. 2), as shown in FIG. 3 (u). Dependent on their respective operational sign, the difference voltage pulses are accepted at the receive side in every subscriber station Tln (in FIG. 1) of the bus system by the one or the other difference bus receiver (E1 or E2 in FIG. 2), and as indicated in FIG. 3 (e1) and FIG. 3 (e2). The RS flip-flop is set or reset by the output signals of the two difference bus receivers E1, E2 again restores the original data form, as may be seen from FIG. 3 (ce) and FIG. 3 (e).

Between two successive difference voltage pulses u (in FIG. 3 u), the difference bus transmitter S (in FIG. 2) of a subscriber station Tln (in FIG. 1 and FIG. 2) is in its quiescent condition of high internal resistance. This quiescent condition lasts about 250 ns or 750 ns in the example dependent on the equality or inequality of successive bits. When, in a collision case, difference voltage pulses transmitted on the bus line system L by another subscriber station Tln (in FIG. 1) now appear in these pulse gaps of the transmission equipment S (in FIG. 2) of a subscriber station Tln (in FIG. 2). These difference voltage pulses are then accepted by the one or the other difference bus receiver E1, E2 (in FIG. 2) of the subscriber station Tln (in FIG. 2), with the result that the RS flip-flop K receives additional setting or resetting pulses, so that falsifications of the data arise at the reception data input (ce) of the LAN controller LANC. Thus, for example given data represented in Manchester Code, bit cells occur wherein the level transition in the middle significant bit cell for the Manchester Code is missing. Let it be assumed that, simultaneously therewith, the subscriber station (Tln in FIG. 2) feeds the bit sequence indicated in FIG. 3(a) and FIG. 3(ca) into the bus system L, whereby another subscriber station (Tln in FIG. 1) simultaneously accesses the bus system L and feeds a different bit sequence thereinto, such as, for example, the sequence shown in FIG. 3(b) and FIG. 3(cb).

This other subscriber station, consequently, supplies the bus system with a correspondingly different difference voltage pulse sequence, as depicted in FIG. 3(v) in the example. As a result, a difference voltage pulse sequence as indicated in FIG. 3(w) caused by the overlaying of the difference voltage pulse sequences of the two subscriber stations accessing the bus system L in collision with one another appears at the two difference receivers E1, E2 of the subscriber station Tln (in FIG. 2). The illustration in FIG. 3 is based overall on a time equality of the bit cells of both subscriber stations established in the subscriber station under consideration. A signal as sketched in FIG. 3(cf) and, thus, a bit sequence as indicated in FIG. 3(f) appears at the output of the bi-stable flip-flop K following the two lying receivers E1, E2. Bit cells falsified due to collision are thereby referenced X in FIG. 3(f), on the basis whereof the collision of subscriber stations Tln (in FIG. 1) simultaneously accessing the bus system L may be recognized.

Let it also be noted, that, in a departure from the exemplary embodiment of a transmission-reception equipment having precisely one difference bus transmitter S set forth with reference to FIG. 2, such a difference bus transmitter can have at least one further difference bus transmitter of the same type connected parallel to it in order to thus correspondingly reduce the internal resistance effective at the transmission side.

Figure 4:
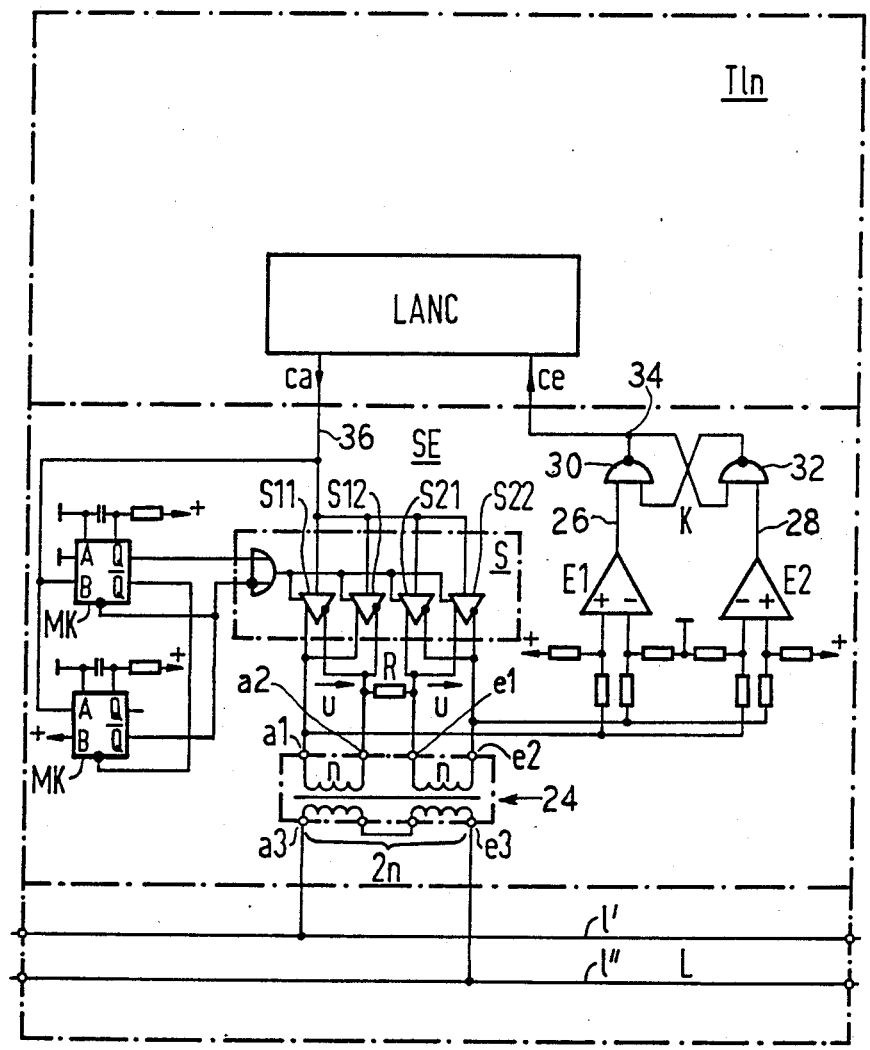
FIG. 4 is a further circuit diagram of a preferred exemplary embodiment of transmission-reception equipment of the present invention.

Such a parallel circuit may also be seen in FIG. 4 which shows another exemplary embodiment of a transmission-reception equipment of the invention in terms of further, circuit-oriented details. According to FIG. 4, a subscriber station Tln again has a transmission-reception equipment SE provided with two difference bus receivers E1, E2 connected oppositely and in parallel to one another and has two first difference bus transmitters S11, S12 connected parallel to one another at the input and output sides. The station also has two second difference bus transmitters S21, S22 connected parallel to one another at the input and output sides and has a repeater 24 which has a primary winding n—n subdivided into two at least approximately identical halves and has a secondary winding 2n having at least approximately the same number of turns as the primary winding n—n and having its two ends a3, e3 connected to the two signal conductors 1', 1" as shown. The two ends a1, e1 of the first primary winding half are connected to the two difference outputs of the two first difference bus transmitters S11, S12, and the two ends a2, e2 of the second primary winding half are connected to the two difference outputs of the two second difference bus transmitters S21, S22. The two ends a1, e2 of the two primary winding halves farthest opposed from one another are connected to the bus receivers E1, E2. A resistor R is inserted between the two center adjacent ends e1, a2 of the two primary winding halves. The value of resistance of this resistor R is high in comparison to the output resistance of the bus transmitter and is low in comparison to the input resistance of the bus receiver.

What is achieved by the indicated relationship of the resistance of the resistor R and the output resistance of the bus transmitter is that the transmission voltages u outputted by the difference bus transmitters connected to the two primary winding halves are respectively transmitted to the secondary side of the repeater 24 associated with the primary winding half, i.e., in parallel and, thus, are coupled into the bus system L with twice the voltage amplitude corresponding to the transmission ratio n:2n. Also, the parallel effect of the two primary winding halves in the transmission direction and of the difference bus transmitters connected thereto produces a halving of the internal resistance effective at the transmission side.

When, as likewise shown in FIG. 4, precisely two difference bus transmitters S11, S12 or S21, S22 connected parallel to one another are provided for each primary winding half, another halving of the internal resistance effective at the transmission side is effected, so that the transformation of the bus load resistance from the primary side of the repeater 24 to the primary side thereof effected with the square of the transmission ratio 2n:n is compensated. The total of four difference bus transmitters S11, S12, S21, S22 require practically no additional cost outlay since commercially available bus transmitter modules, for instance type SN74ALS1631, already contain four such bus transmitters.

In the reception direction, opposite to the transmission direction, the indicated ratio of resistance between the resistor R and the input resistance of the bus receiver results from the fact that the two primary winding halves take effect in their actual series circuit and that the signal voltages incoming on the signal conductors 1', 1" of the bus system L are transmitted to the bus receivers E1, E2 with the transmission ratio 1:1. Since, in the final analysis, the voltage doubling achieved in the transmission direction is thus not in turn cancelled by a voltage halving in reception direction, it can be assured that every receiver receives the signal voltages with an amplitude which still enables a reliable response, even given a relatively extensive bus system having, for example, a cable length of 300 m and thereby loaded, for example, by 16 subscriber stations.

Individual difference bus transmitters S11, S12, S21, S22 are unlocked for only a fraction of a bit time span after every level transition of the supplied transmission data. They output a positive or negative difference voltage pulse u dependent on the new signal status. As was already mentioned above with respect to FIG. 2, the difference bus transmitters can be realized with tri-state bus transmitters of a bus transmitter module S, for example type SN74ALS1631, having a quiescent condition as a third condition in addition to two signal statuses. These have their unlock inputs supplied with a respective unlocking pulse lasting only a fraction of a bit time span after every level transition of the transmission data received at the transmission data input of the difference bus transmitters. Such unlocking pulses can be derived from the transmission data, for example by the use of two monostable circuits, for instance type 74LS23, activated for a level transition of the one or the other operational sign, as referenced MK in FIG. 4. As likewise shown in greater detail in FIG. 4, two difference bus receivers E1, E2 (for example, type SN75173) connected in mutually opposite senses to the repeator 24 and, therefore, to the signal conductors 1', 1" of the bus system L are again provided at the reception side. These have their output sides 24, 28 connected to the S input or R input of a bi-stable RS flip-flop K which, according to FIG. 4, is realized with two cross-coupled NAND elements 30, 32, for example type SN74ALS00. In the subscriber station Tln depicted in FIG. 4, the reception data input ce of a LAN controller LANC (for example, type 82588) is connected to the output 34 of the RS flip-flop K, the transmission data output ca of this LAN controller LANC leading to the transmission data input 36 of the difference bus transmitters S11, S12, S21, S22.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Transmission-reception equipment for a bus system having two signal conductors, having a difference bus transmission side coupled to said signal conductors via two difference outputs thereof, and having a difference bus reception side connected to the signal conductors via two difference inputs thereof, comprising at least one difference bus transmitter, respectively unlocked only for a fraction of a bit time span after every level transition of transmission data supplied to the bus transmitter and thereby outputting a positive or negative difference voltage pulse dependent on a signal level of the transmission data, provided at the transmission side, this at least one difference bus transmitter being in a quiescent condition of high internal resistance during the remaining part of every bit time span; and two difference bus receivers each having at least positive and negative inputs connected to the signal conductors oppositely relative to the polarity of their inputs, and a bi-stable RS flip-flop having its two inputs connected to outputs of the two difference bus receivers on the reception side.

2. The transmission-reception equipment according to claim 1, wherein the difference bus transmitter is unlocked only for about one-fourth of a bit time span, outputting a positive or negative difference voltage pulse, and is situated in its quiescent condition of high internal resistance for about three-fourths of a bit time span.

3. The transmission-reception equipment according to claim 1, wherein a transmission data input of the difference bus transmission is connected to a transmission data output of a LAN controller and an output of the RS flip-flop is connected to a reception data input of the LAN controller.

4. Transmission-reception equipment for a bus system having two signal conductors, having a difference bus transmission side coupled to said signal conductors via two difference outputs thereof, and having a difference bus reception side connected to the signal conductors via two difference inputs thereof, comprising at least one difference bus transmitter, respectively unlocked only for a fraction of a bit time span after every level transition of transmission data supplied to the bus transmitter and thereby outputting a positive or negative difference voltage pulse dependent on a signal level of the transmission data, provided at the transmission side, this at least one difference bus transmitted being in a quiescent condition of high internal resistance during the remaining part of every bit time span; and two difference bus receivers each having at least positive and negative inputs connected to the signal conductors oppositely relative to the polarity of their inputs, a bi-stable RS flip-flop having its two inputs connected to outputs of the two difference bus receivers on a reception side, a repeater having a primary winding subdivided into two at least approximately identical halves and having a secondary winding having at least approximately the same number of turns as the primary winding and having its two secondary ends connected to the two signal conductors, two primary ends of the first primary winding half connected to the two difference outputs of at least one first difference bus transmitter, two primary ends of the second primary winning half are connected to two difference outputs of at least one second difference bus transmitter, connected parallel at the input side to the primary winding halves farthest opposed from one another connected to at least one difference bus receiver and a resistor connected between two center adjacent center ends of the two primary winding halves, the value of resistance of said resistor being high in comparison to an output resistance of the bus transmitter and being low in comparison to an input resistance of the bus receiver.

5. The transmission-reception equipment according to claim 4, wherein said equipment further comprises two first difference bus transmitters connected parallel to one another at input and output sides and two second difference bus transmitters connected parallel to one another at input and output sides.

6. Transmission-reception equipment for a bus system having two signal conductors, having a difference bus transmission side coupled to said conductors via two difference outputs thereof, and having a difference bus reception side connected to the signal conductors via two difference inputs thereof, comprising:

at least one difference bus transmitter in the difference bus transmission side, said difference bus transmitter unlocked only for a fraction of a bit time span after every level transition of transmission data supplied to the difference bus transmitter and thereafter said difference bus transmitter outputting a positive or negative difference voltage pulse dependent on a signal level, of the transmission data, said difference bus transmitter being in a quiescent condition of high internal resistance during the remaining part of every bit time span; and two difference bus receivers, each having positive and negative inputs, in the difference bus reception side and having their inputs connected to the signal conductors with opposed polarity; and in the difference bus reception side a bistable RS flip-flop having its two inputs connected to outputs of the two difference bus receivers, respectively.

7. The transmission-reception equipment according to claim 6, wherein the difference bus transmitter is unlocked only for about one-fourth of a bit time span, outputting a positive or negative difference voltage pulse, and is situated in its quiescent condition of high internal resistance for about three-fourths of a bit time span.

8. The transmission-equipment according to claim 6, wherein a transmission data input of the difference bus transmitter is connected to a transmission data output of a LAN controller and an output of the RS flip-flop is connected to a reception data input of the LAN controller.

9. Transmission-reception equipment for a bus system having two signal conductors, having a difference bus transmission side coupled to said conductors via two difference outputs thereof, and having a difference bus reception side connected to the signal conductors via two difference inputs thereof, comprising:
at least one difference bus transmitter in the difference bus transmission side, said difference bus transmitter unlocked only for a fraction of a bit time span after every level transition of transmission data supplied to the difference bus transmitter and thereafter said difference bus transmitter outputting a positive or negative difference voltage pulse dependent on a signal level of the transmission data, said difference bus transmitter being in a quiescent condition of high internal resistance during the remaining part of every bit time span; and
two difference bus receivers, each having positive and negative inputs, in the difference bus reception side and having their inputs connected to the signal conductors with opposed polarity;
in the difference bus reception side a bi-stable RS flip-flop having its two inputs connected to outputs of the two difference bus receivers, respectively;
and a repeater having a primary winding subdivided into two at least approximately identical halves and having a secondary winding having at least approximately the same number of turns as the primary winding and having its two secondary ends connected to the two signal conductors, two primary ends of the first primary winding half connected to the two difference outputs of at least one first difference bus transmitter, two primary ends of the two primary winding halves farthest opposed from one another connected to at least one difference bus receiver, and a resistor connected between two center adjacent ends of the two primary winding halves, the value of resistance of said resistor being high in comparison to an output resistance of the bus transmitter and being low in comparison to an input resistance of the bus receiver.

10. The transmission-reception equipment according to claim 9, wherein said equipment further comprises two first difference bus transmitters connected parallel to one another at input and output sides and two second difference bus transmitters connected parallel to one another at input and output sides.

11. Transmission-reception equipment for a bus system having two signal conductors, having a difference bus transmission side coupled to said signal conductors via two difference outputs thereof, and having a difference bus reception side connected to the signal conductors via two difference inputs thereof, comprising at least one difference bus transmitter, respectively unlocked only for a fraction of a bit time span after every level transition of transmission data supplied to the bus transmitter and thereby outputting a positive or negative difference voltage pulse dependent on a signal level of the transmission data provided at the transmission side, this at least one difference bus transmitter being in a quiescent condition of high internal resistance during the remaining part of every bit time span.

* * * * *